United States Patent [19]

Krogsrud

[11] Patent Number: 4,744,019
[45] Date of Patent: May 10, 1988

[54] COUNTERBALANCED ARM ASSEMBLY
[75] Inventor: Jessan C. Krogsrud, Oslo, Norway
[73] Assignee: Jac Jacobsen A/S, Oslo, Norway
[21] Appl. No.: 906,302
[22] Filed: Sep. 12, 1986
[51] Int. Cl.⁴ ............................................. F21V 21/18
[52] U.S. Cl. ..................................... 362/402; 362/33; 362/427
[58] Field of Search .................. 248/162.1, 280.1, 585, 248/586; 362/33, 401, 402, 413, 427

[56] References Cited
U.S. PATENT DOCUMENTS

| | | | |
|---|---|---|---|
| 2,547,532 | 4/1951 | Mendelsohn | 362/427 X |
| 3,820,752 | 6/1974 | Oram | 362/427 X |
| 4,494,177 | 1/1985 | Matthews | 362/402 |

Primary Examiner—Stephen F. Husar
Attorney, Agent, or Firm—Pasquale A. Razzano

[57] ABSTRACT

A counterbalanced arm assembly is disclosed which includes a mounting bracket and a first arm pivotally connected to the mounting bracket along a first pivot axis. The first arm includes an inner arm located within it which is pivotally connected to the mounting bracket along a second pivot axis. A spring carrier is located near the first pivot axis and a tension spring is connected between the carrier and the bracket. The spring carrier includes a lower end defining a pair of spaced bearing surfaces located respectively to engage a pair of bearing surfaces on the bracket, with the spring biasing the bearing surfaces into engagement and providing the counterbalancing forces for the arm assembly. The bearing surfaces of the spring carrier are located on opposite sides of the first pivot axis so that as the first arm is pivoted about its first pivot axis in either direction from the vertical, one or the other of the spring carrier bearing surfaces engages the bearing surfaces of the bracket causing the glider to exert a counterbalancing force against one or the other of the inner surfaces of the first arm. The spring provides the exact counterbalancing force to the arm assembly at all angles to which the arm can be moved.

12 Claims, 7 Drawing Sheets

COUNTERBALANCED ARM ASSEMBLY

BACKGROUND OF THE INVENTION

The present invention relates to counterbalanced arm assemblies, and more particularly to a counterbalanced arm support mechanism for a lamp or the like.

Counterbalanced or equipoised arm assemblies for lamps have been used for many years. The traditional method of counterbalancing an arm support assembly which is pivotally mounted at one end on a mounting bracket and which carries a load at the other end is to fasten one end of a coiled spring to the bracket above the pivoting point and the other end of the spring towards the middle of the arm. This traditional type of arrangement is shown, for example, in U.S. Pat. Nos. 2,787,434; 3,041,060; 3,226,073; 3,543,019; 3,774,873; and 4,080,530.

In counterbalanced arm assemblies of the type shown in the above-mentioned patents, it is generally desirable that the lower arm connected to the support bracket be capable of pivoting or tilting back and forth to an angle of about 60° on either side of the vertical. Prior devices, such as disclosed in the above patents, permit this type of movement while balancing the pivoted arm. As can be seen from the above-noted patents the counterbalancing is achieved with one or more relatively long springs. In double arm constructions, such as shown in the earlier patents, this counterbalancing is traditionally done with one spring on either side of the pivoting arm. However, aesthetic and hygenic requirements often make it desirable to have the spring enclosed within the arm, as is shown in the later patents. However, this confinement of the spring within the arm makes it difficult to obtain proper balancing leverage and torque. With the spring confined, the distance from the pivoting point of the arm to the point on the arm where the spring is connected is restricted, so that the spring has to be both long and heavy in order to produce the necessary counterbalancing force.

OBJECTS OF THE INVENTION

It is an object of the present invention to provide an improved counterbalanced and equipoised support arm assembly for lamps and other objects, which utilizes an enclosed spring of relatively small dimensions.

A further object of the invention is to support relatively heavy objects throughout a wide range of movement with a minimum of variation in the balancing forces, utilizing a relatively small counterbalancing spring arrangement.

A further object of the invention is to support an object with great precision yet permit the object to be moved from position to position with relatively small resistance forces.

A still further object of the invention is to prove an equipoised support arm mechanism which is sturdy in construction, dependable and safe in use, and which will perform satisfactorily over long periods of use.

SUMMARY OF THE INVENTION

In accordance with an aspect of the present invention a counterbalanced arm assembly is provided which includes a mounting bracket and a first arm pivotally connected to the mounting bracket along a first pivot axis. The first arm encloses an inner arm which is also pivotally connected to the mounting bracket, but along a second pivot axis. A counterbalance mechanism is provided within the first arm and is operatively engaged with the first arm to counterbalance the arm assembly. A second arm, which actually carries the lamp head or other object, is pivotally connected through a bushing or the like to the upper ends of both the first arm and the inner arm.

The inner arm includes a channel defined therein which receives and partially surrounds a spring carrier. The spring carrier has an opposite, lower end which defines a pair of spaced bearing surfaces respectively located on opposite sides of the first axis on which the first arm is pivoted. A spring is operatively engaged between the spring carrier and bracket to urge the bearing surfaces of the spring carrier into engagement with generally complementary bearing surfaces on the bracket itself. By this arrangement, when the first arm is moved over across the vertical position, the location of application of the counterbalancing forces between the bracket and the first arm is transferred from one side of the first axis or pivot point of the first arm to the other. This arrangement permits a single, smaller spring to be utilized than has been heretofore been considered practical in the art.

BRIEF DESCRIPTION OF THE DRAWINGS

The above, other objects, features and advantages of the invention will be apparent in the following detailed description of an illustrative embodiment thereof, which is to be read in connection with the accompanying drawings, wherein.

DETAILED DESCRIPTION OF THE INVENTION

Figure 1:
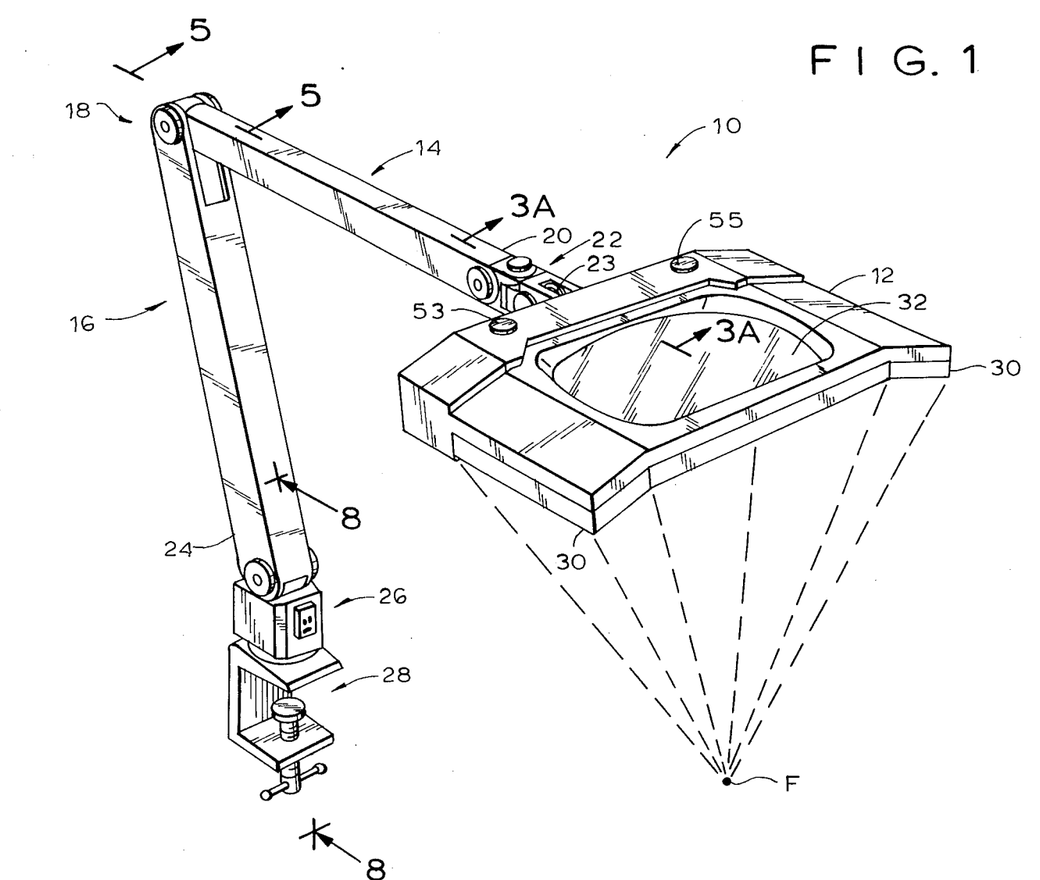
FIG. 1 is a perspective view of a counterbalanced arm assembly for a lamp head, constructed in accordance with the present invention.

Referring now to the drawings in detail, and initially to FIG. 1 thereof, a counterbalanced arm assembly 10 is illustrated for supporting a lamp head 12. The arm assembly includes an upper arm 14 and a lower arm 16 pivotally connected to each other by an intermediate pivot joint assembly 18. Lamp head 12 is connected to the upper end 20 of arm 14 through a universal joint assembly 22. The lower end 24 of arm 16 is pivotally connected for pivotal movement about horizontal and vertical axes by a bracket assembly 26. Bracket assembly 26 is mounted on a clamp 28 or the like which can be secured to the edge of a desk for other work surface.

The arm assembly includes counterbalanced spring arrangements, more particularly described hereinafter, which permit arms 14, 16, to be pivoted relative to each other and to the bracket 28 through a variety of angles of movement while holding lamp head 12 in a stable relatively horizontal position regardless of the angle to which the arms are moved.

Figure 2:
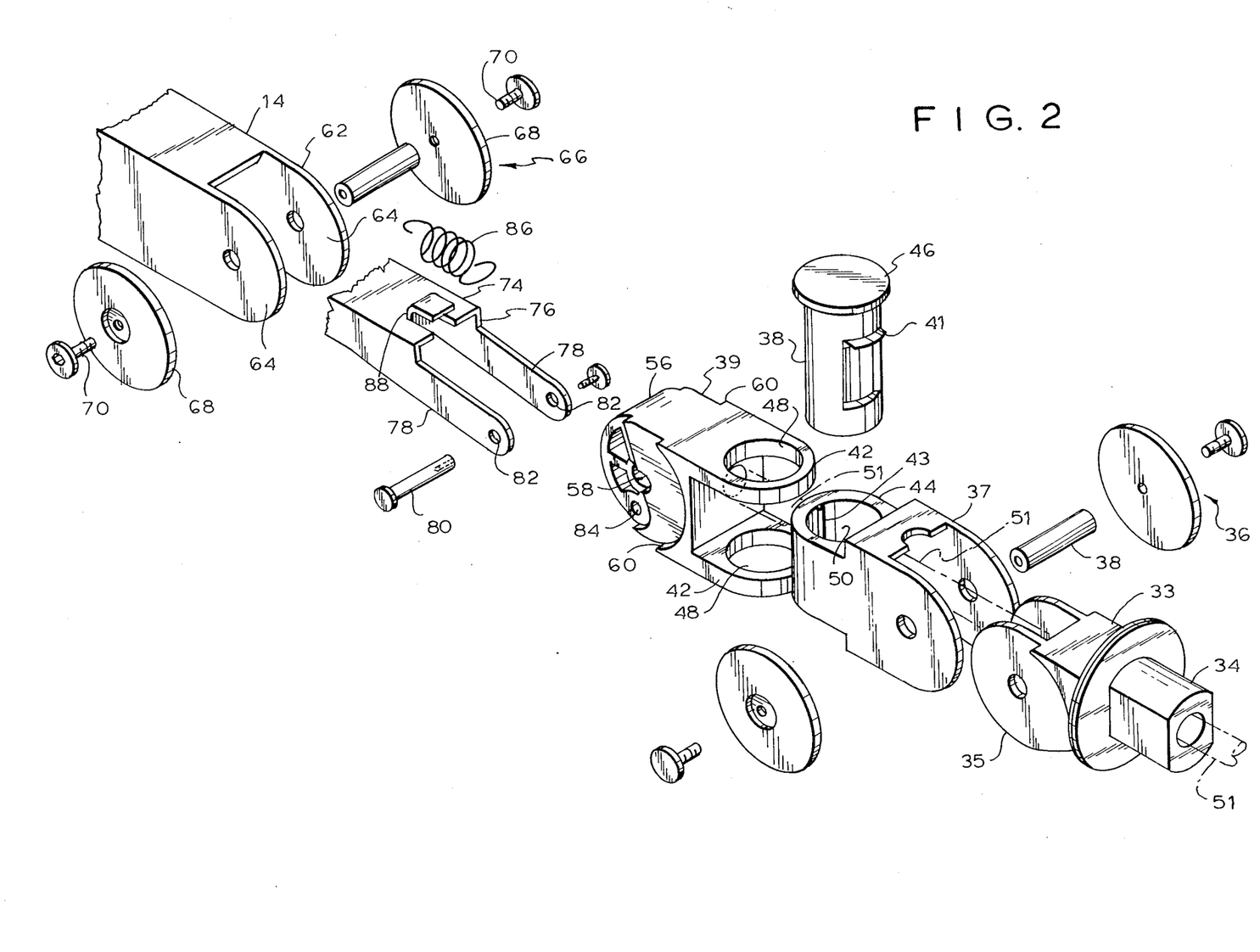
FIG. 2 is a partial exploded perspective view of the mounting arrangement for the lamp head shown in FIG. 1.
Figure 3A:
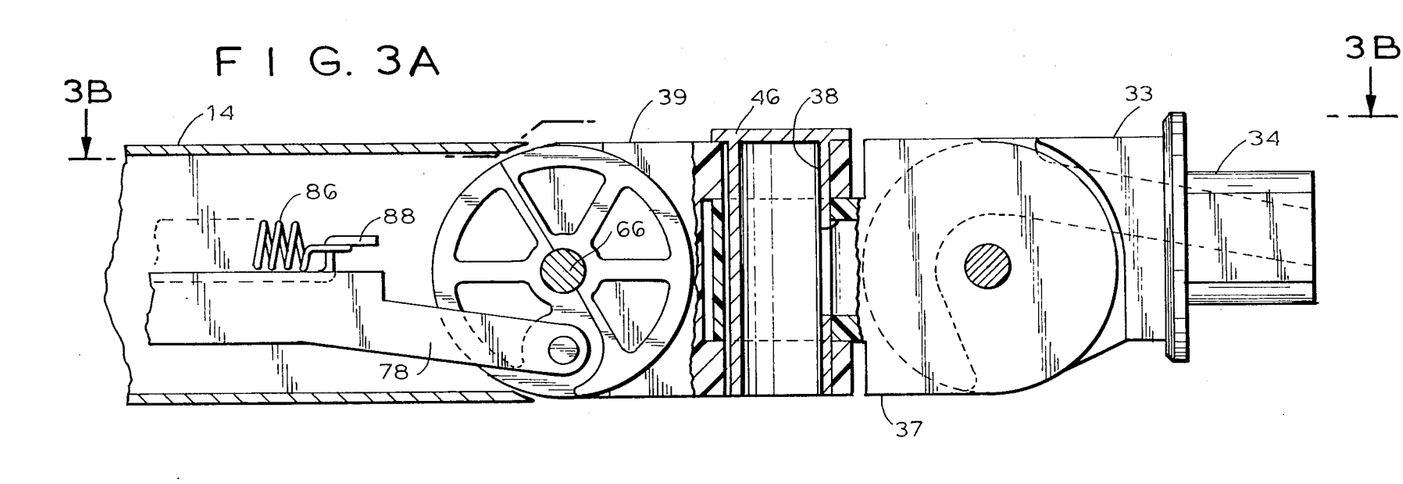
FIG. 3A is a side sectional view of the lamp head mounting arrangement taken along line 3A—3A of FIG. 1.
Figure 3B:
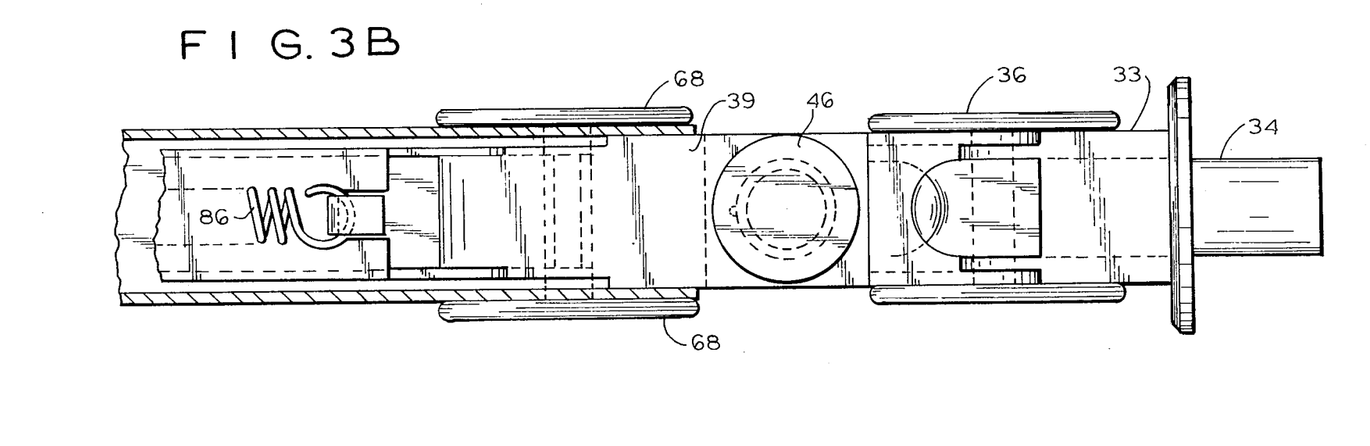
FIG. 3B is a top sectional view taken along line 3B—3B of FIG. 3A.

Referring to FIGS. 1 and 2 of the drawing, lamp head 12 includes socket mounting arrangements (not seen in the drawing) for receiving conventional PL-type fluorescent bulbs which project light through lenses 30 located on opposite sides of a magnifying lens 32 mounted in the head. The lenses 30 are positioned at angles to each other and to lens 32, as shown, to direct the light from the bulbs to the focal point F of the lens. This unique arrangement provides maximum illumination under the viewing area of lens 32.

Head 12 includes a mounting stem 33, as seen in FIG. 2, which includes a shaft 34 received in the head to permit the head to pivot about the axis of stem 34. The opposite end 35 of stem 33 is pivotally connected through a pivot assembly 36 to a neck member 37 to permit stem 33 to pivot about the axis of the pin 38 of assembly 36. Neck member 37 is, in turn, pivotally mounted by a pivot pin 38' or the like to a neck arm joint member 39. As seen in FIG. 2 joint member 39 has a yoke formed at one end defined by two arms 42, which receive the end 44 of neck member 37. The pivot pin 38 has a head 46 and a hollow stem which includes a resilient latch or tab 41. The stem passes through apertures 48, 50 respectively formed in the arms 42. The latch 41 engages and locks in a slot 43 formed in aperture 50 to keep these elements assembled. It also permits the power wire 51 (shown in dotted lines in the drawing) to pass from the neck assembly into the head 12, as shown.

Head 12 includes separately operable switches 53, 55 for separately controlling the PL bulb behind lenses 30. This permits the operator to light one or the other of the bulbs separately to create a shadow on the workpiece at focal point F. This is important for certain applications such as printed circuit board inspections where shadows are used for checking quality of the circuit welding.

The end 56 of neck joint 39 has a pivot opening 58 formed therein and is slightly narrower than the remainder of the body of the joint. This arrangement defines arcuate shoulders 60.

The end 56 of neck joint 39 is received in the end 62 of upper arm 14. This end of the arm, which is generally shaped as a square tube, is open and defines two ears 64 having curved ends which are generally complementary to the shoulders 60 of the neck joint. The joint is pivotally connected to arm 14 by a pivot pin assembly 66 which is similar in construction to the pivot pin assembly 36. This assembly includes a pair of enlarged washers 68 and a pair of Allen headed bolts 70 threaded through the washers into the opposed ends of pin 66'. In this manner, the neck joint is pivotally connected to arm 14 about an axis which is perpendicular to the axis defined by the pivot pin 38.

An inner arm 74 is received within the arm 14. This inner arm includes an upper end 76 having two ears 78 formed therein. These ears are positioned on either side of the end 56 of the neck joint 39 and are pivotally connected thereto by a pin 80 which passes through apertures 82 formed in the ears 78 and an aperture 84 formed in the neck joint 39. In this manner both the inner arm 74 and the upper arm 14 are pivotally connected to the neck joint along spaced parallel axes.

FIGS. 3A, 3B, 4 and 5 illustrate the mechanism by which a counterbalancing force is applied to the neck joint 39 about the pivot pin 66. The head 12 is maintained in a relatively horizontal position when the arm 14 pivots about the joint 18 as a result of the parallelogram structure defined by the arms 14 and 74 and their respective pivotal mountings. As seen therein an elongated coiled tension spring 86 is connected to a tab 88 formed on the upper end of arm 74. The opposite end 89 of the spring 86 is connected to a glider or slide 90. The slide 90 is formed of a plastic low friction material and has a pair of opposed channels 92 formed therein. These channels receive the edges 94 of a slot 96 formed in the arm 74 so that it can slide within the slot. The end 89 of spring 86 is received in another channel 100 in glider 90, which channel face is opened to face towards the neck joint. A metal hook 102 having a hooked end 104 is positioned with the hooked end thereof in a vertical slot 106 in glider 90. The slot 106 intersects the slot 100 so that the open side 108 of hook 104 can engage in the loop at the end 89 of spring 86 to hold the spring in the glider. The opposite end 110 of hook 102 is pivotally connected by a pin 112 to and between a pair of bushings 114 which form part of the joint 18.

Figure 4:
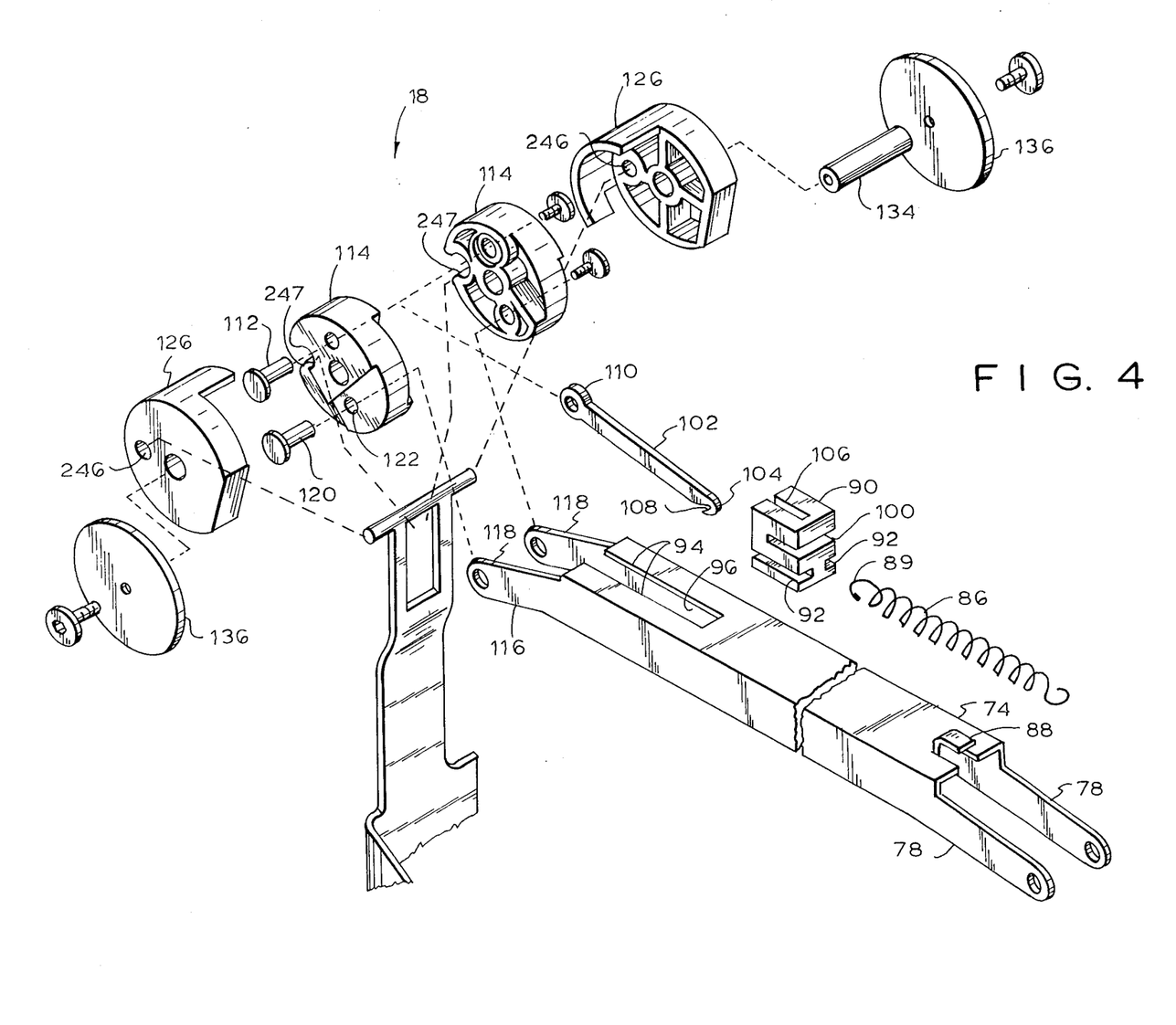
FIG. 4 is an exploded perspective view of the intermediate joint between the upper and lower arms of the lamp head assembly shown in FIG. 1.

The rear end 116 of arm 74 also has a pair of ears 118 formed therein which straddle bushings 114 and are pivotally connected to them through a pin 120 mounted in openings 122 in the bushings. In this manner the inner arm can pivot about the axis defined by the pin 120.

Figures 5, 6:
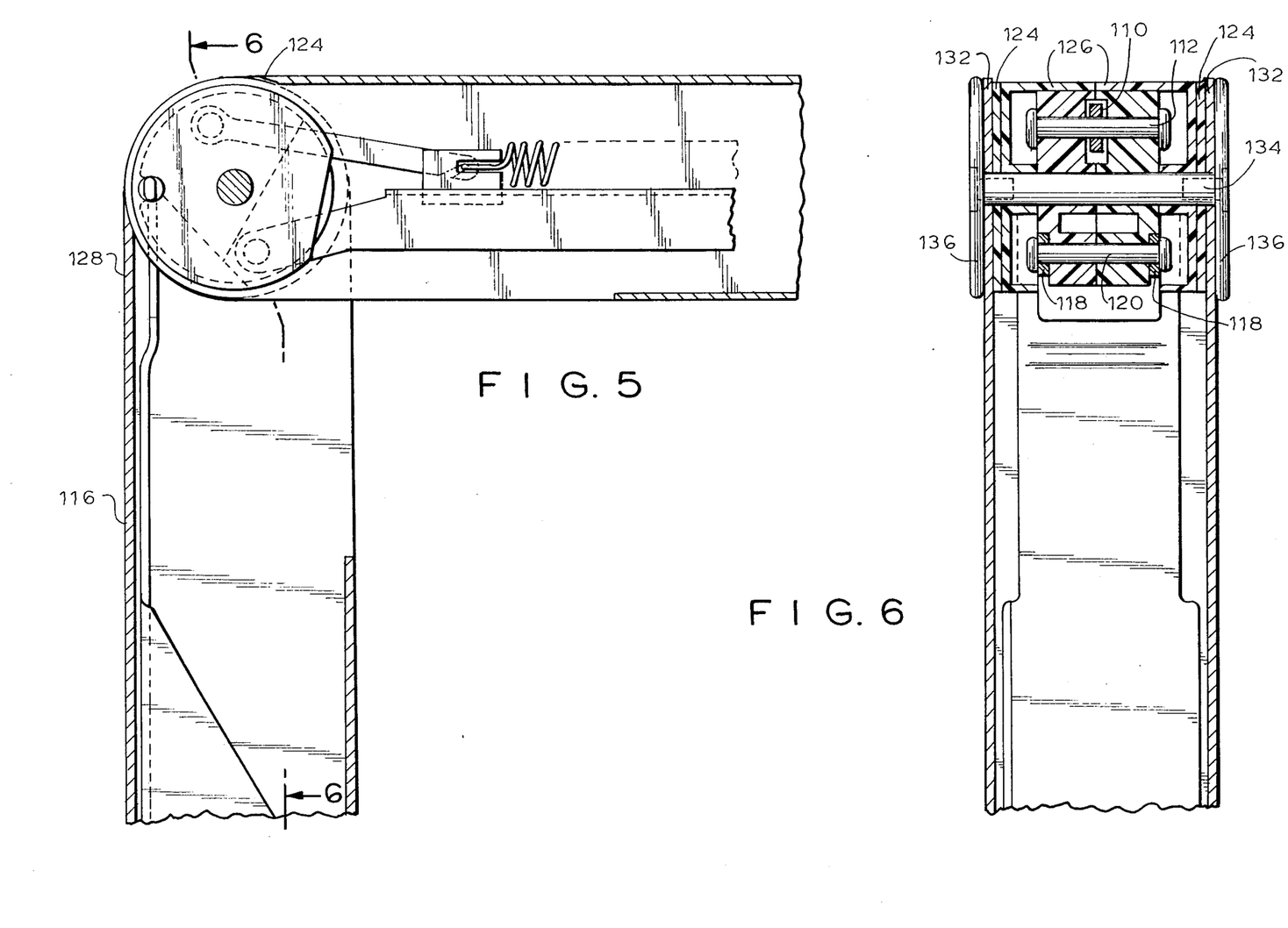
FIG. 5 is a sectional view of the intermediate joint taken along lines 5—5 of FIG. 1.
FIG. 6 is a sectional view taken along line 6—6 of FIG. 5.

The rear end 124 of arm 14 is also pivotally connected to the bushings 114. As seen in FIG. 6, the rear end 124 of arm 14 is open and receives bushings 114. In addition, it receives a pair of mirror image cover elements 126, which surround the bushings 114, as seen in FIGS. 4 and 6. The upper end 128 of lower arm 16 also is open and defines two ears 132 which straddle the ends 124 of the arm 14 and are pivotally connected to bushings 114 along the same axis as the arm 14. This pivotal connection is formed by pin 134, a pair of washers 136, and a pair of Allen headed screws 138 which are received in the ends of pin 134. In this manner both arms are pivotally connected to the bushing about pin 134.

Figure 7:
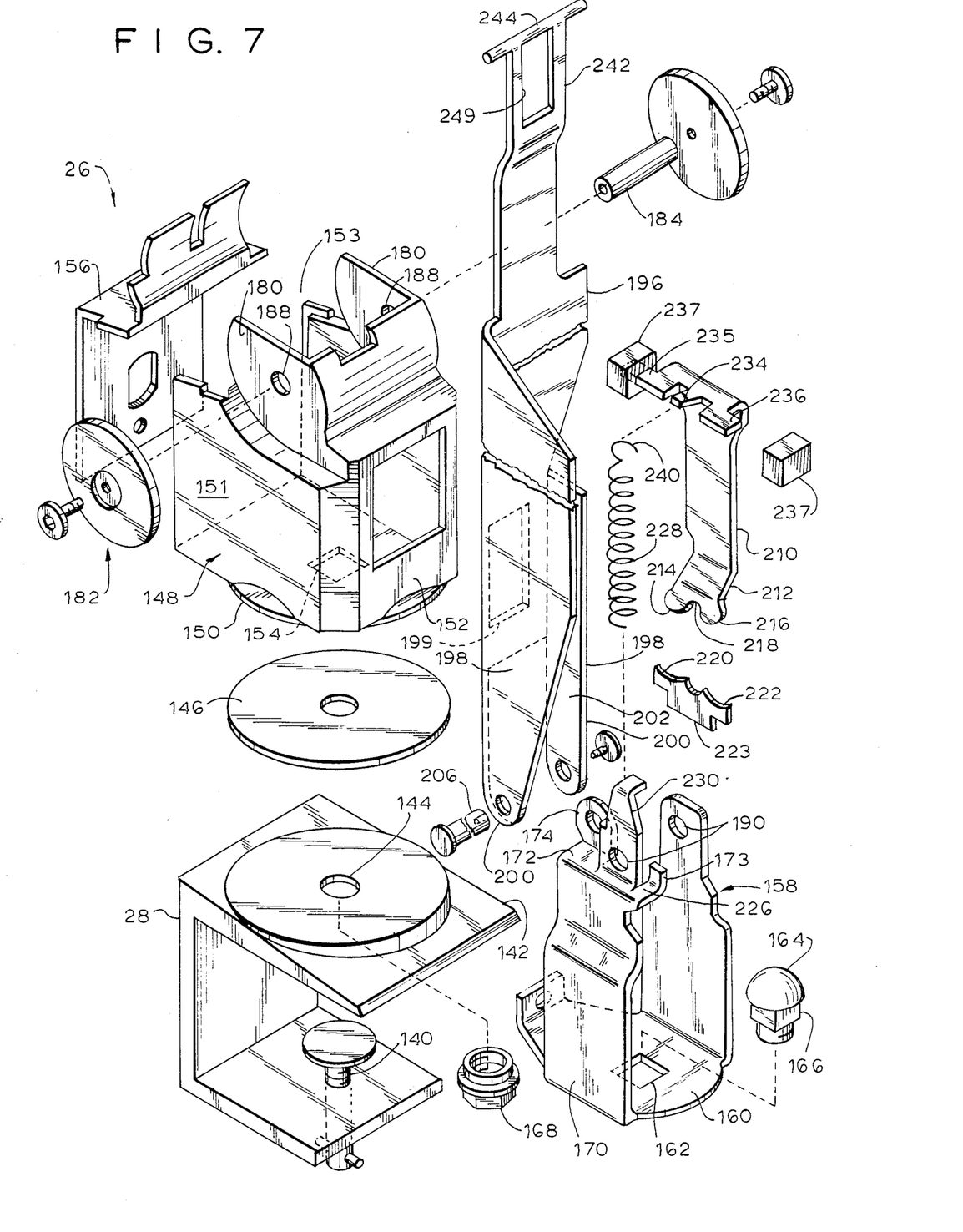
FIG. 7 is an exploded perspective view of the mounting arrangement and counterbalancing system used to secure the lower end of the lower arm to the mounting bracket for the lamp assembly shown in FIG. 1.
Figure 8:
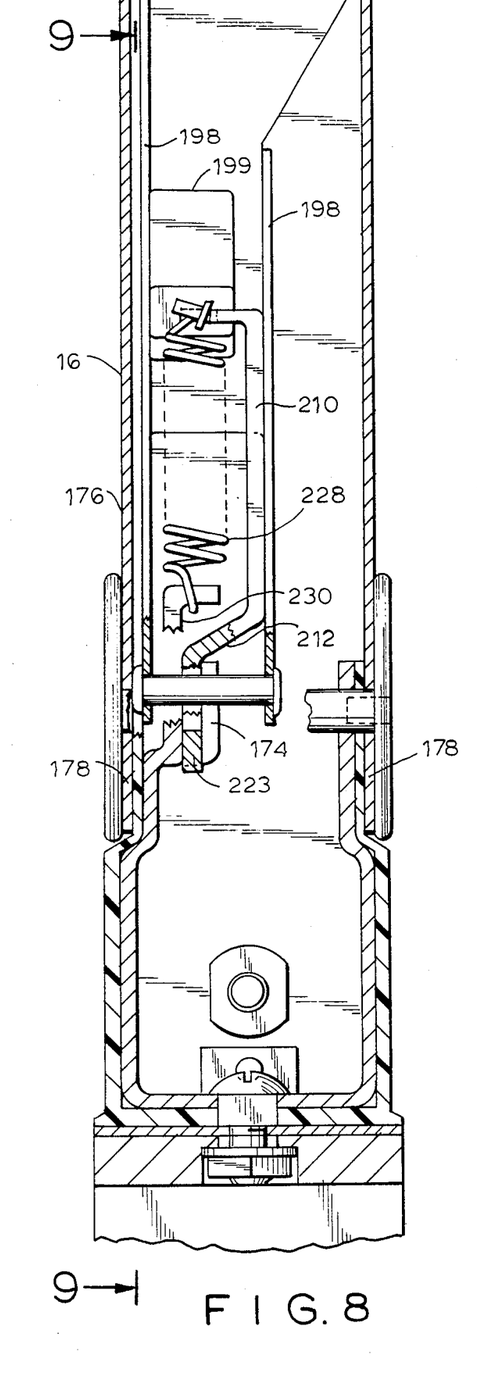
FIG. 8 is a sectional view of the mounting bracket assembly taken along line 8—8 of FIG. 1.
Figure 9:
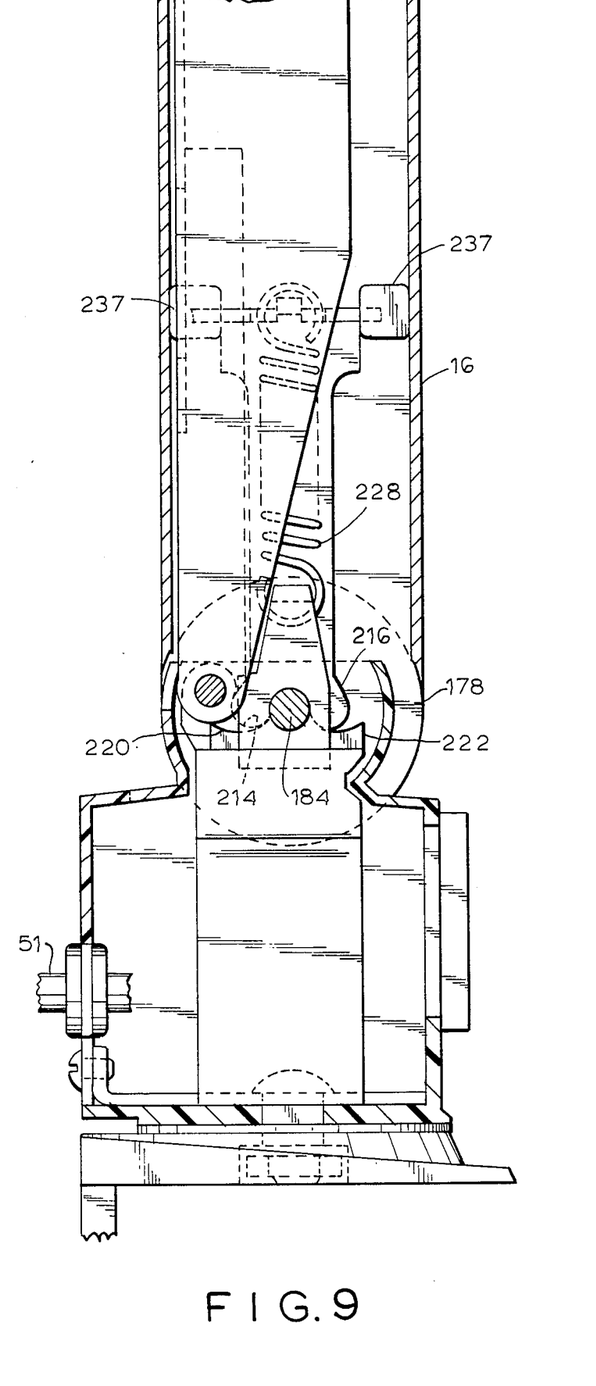
FIG. 9 is a sectional view taken along line 9—9 of FIG. 8.

Referring now to FIGS. 7, 8 and 9, the mounting arrangement for the lower arm 16 is illustrated. As seen therein the mounting clamp 28 is of generally conventional construction and includes a clamp bolt 140 which will operate in the conventional manner to secure the clamp to the edge of a desk or the like. The clamp has an upper jaw 142 including a pivot opening 144 therein through which the lower arm is pivotally mounted on a vertical axis to turn with respect to the clamp. A shim 146 is positioned on the upper surface of the jaw 142 and serves as a bearing for the outer housing 148 of the bracket assembly 26. This housing has a base 150, side walls 151, a front wall 152 and an open rear end 153. An aperture 154 is formed in the base 150 to be aligned with the opening 144 in the clamp jaw. The open side 153 of the housing 148 is closed by a cover plate 156, which is secured to the housing by a nut or screw in any convenient matter.

An inner bracket 158 is located and contained within the cover 148. This bracket has a generally U-shape which includes a base 160 having a square opening 162 formed therein. A bolt 164 having a square upper portion 166 beneath its head is received within the opening 162 and passes through openings 154, 144. It is engaged with a nut 168 beneath jaw 142 to hold the bracket on jaw 142 while permitting the outer housing 148 to pivot with the inner bracket therein about a vertical axis.

One of the legs 170 of bracket 158 has an L-shaped flange 172 formed at its upper end. This flange includes an extension or tongue 173 and an ear 174 formed thereon.

Arm 16 has a lower end 176 which is open to define ears 178. These ears straddle the ears 180 of housing 148 and are pivotally connected to the housing by a pivot pin assembly 182 similar in construction to pivot pin assemblies previously described. This pin assembly includes a pin 184 which passes through the opening 188 in ears 180 and through openings 190 in the upper ends of the arms 170 of bracket 158. The pin 184 is supported in the opening 190 of the metal bracket 158, with the openings 188 of the plastic bracket 148 being of large enough diameter not to contact pin 184.

An inner arm 196 is contained within the generally square cross section of lower arm 16. Inner arm 196 include a pair of flanges 198 which have lower ends 200. Flanges 198 define a channel 202 therebetween and are pivotally mounted to the bracket 158 by a pivot pin 206 about an axis which is spaced from the pivot axis of the arm 16, defined by the pin 184.

A spring carrier 210 is located within the channel 202 defined by the flanges 198. This spring carrier has a lower end 212 which is formed as a yoke having a pair of rounded legs 214, 216 respectively with a space or opening 218 therebetween. The spring carrier is located such that the legs 214, 216 straddle the pivot pin 184, as seen in FIG. 9. The rounded surfaces of the members 214, 216 define bearing surfaces which engage generally complementary bearing surfaces 220, 222 respectively of a metal cradle 223 which is mounted on the shoulder 226 of the flange 172, between a hook 230 formed as an extension of the flange and the tongue 173 and bar 174.

A coiled tension spring 228 is connected at one end to the hook 230 of flange 172 and at its opposite end to a hook or tongue 234 formed at the upper end of the spring carrier 210. The upper end of the spring carrier has oppositely extending ears 235, 236 on which friction plastic gliders or slide members 237 are seated. The hooked end 240 of spring 228 is engaged over the tongue 234 to apply a tension force to the spring carrier biasing it downwardly so that its ends 214, 216 are engaged with the cradle.

The spring carrier is bent, as seen in FIG. 9, so as to slide adjacent one of the flanges 198 of the inner arm to aid in stabilizing the carrier during movement. The inner arm includes a slot 199 formed therein through which one of the slide members passes to engage the inner surface of the rear wall of outer arm 16 (also referred to herein as the first arm) while the other slide member engages the inner surface of the front wall of arm 16, thereby to apply the counterbalancing force of the spring to the arm.

The upper end 242 of arm 196 includes an elongated pivot pin 244 which is received in pivot openings 246 of covers 126 and in the hooked jaws 247 formed in bushing 114. These hooked jaws enter the slot 249 formed in arm 196.

By this arrangement, as seen in FIG. 9, when the arm 16 is in the vertical position, the spring 228, which need be only about one and one-half inches in length or less, is vertically aligned with the pivot axis of the arm 16 as defined by the pin 184. When the arm is moved from the vertical in clockwise direction, as seen in FIG. 9, the bearing surface 216 will be engaged with the bearing surface 222 defined by the cradle, so that the line of application of the force provided by the spring 228 is to the right of the pivot pin providing a balancing force as a result of the engagement of the slide or glider 237 with the inner surface of the rear wall of the outer arm. On the other hand, when the arm 16 is pivoted in a counter-clockwise direction to the left in FIG. 9, the bearing surface 214 is engaged with the bearing surface 220 so that the line of application of the force provided by the spring 228 is to the left of the pivot pin 184, to counterbalance the weight of the arm assembly against further movement in the counter-clockwise direction, with the other slide engaged against the inner surface of the pivot wall of arm 16. The arm will remain in whatever pivoted position it is moved to by this assembly. In addition, the engagement of the upper end 242 of the arm 196 with the bushings 114 and cover elements 126 serves to keep the angular position of the joint assembly 18 fixed relative to the surface on which the lamp is mounted as the arm 16 is pivoted. That is, its angular position relative to work surface remains the same regardless of the position to which the arm 16 is moved. Thus, arms 16 and 14 can be moved together or independently without effecting the angular position of head 12.

Although an illustrative embodiment of the present invention has been described herein, it is to be understood that various changes and modifications thereof can be effective without departing from the scope or spirit of this invention.

What is claimed is:

1. In a counterbalanced arm assembly, including a mounting bracket and a first arm pivotally connected to said mounting bracket, the improvement comprising means for balancing said first arm including an inner arm located within said first arm and pivotally connected to said bracket along a second pivot axis; said bracket including a pair of spaced bearing surfaces; a spring carrier having a pair of spaced bearing surfaces respectively located to selectively engage said bearing surfaces of the bracket; a tension spring operatively engaged between said bracket and said spring carrier to bias said bearing surfaces of the carrier and bracket into engagement when the first arm is in a substantially vertical position; and means on said spring carrier for engaging the inner surfaces of said first arm whereby pivotal movement of the first arm from the vertical position causes said engaging means to transmit a counterbalancing force from said spring to said first arm to hold the first arm to whatever position it is moved to.

2. An assembly as defined in claim 1 wherein said carrier has a lower end and a yoke forward on said lower end including two legs, said legs respectively forming the bearing surfaces of said spring carrier; said yoke straddling said first axis.

3. In a counterbalanced arm assembly, including a mounting bracket and a first arm pivotally connected to said mounting bracket along a first pivot axis, the improvement comprising means for balancing said first arm including an inner arm located within said first arm and pivotally connected to said bracket along a second pivot axis; means within said first arm for applying a counterbalancing force from one side of said first axis to the other as said first arm is pivoted from one side of a vertical position to the other.

4. An assembly as defined in claim 3 wherein said means for applying a counterbalancing force includes a spring carrier, a spring, and means for connecting one end of said spring to said carrier and another end to said bracket at a position in vertical alignment with said first axis.

5. In a counterbalanced arm assembly, including a mounting bracket and a first arm pivotally connected to said mounting bracket along a first pivot axis, the improvement comprising means for balancing said first arm including an inner arm located within said first arm and pivotally connected to said bracket along a second pivot axis; means within said first arm for applying a counterbalancing force from one side of said first axis to the other as said first arm is pivoted from one side of a vertical position to the other; said means for applying a counterbalancing force including a spring carrier, a spring, and means for connecting one end of said spring to said carrier and another end to said bracket at a position in vertical alignment with said first axis; and said means for applying counterbalancing force including means for slidably engaging said spring carrier arm with said first arm.

6. An assembly as defined in claim 5 wherein said slidably engaging means includes at least one glider shoe mounted on said carrier.

7. An assembly as defined in claim 5 wherein said spring carrier includes a lower end having a yoke formed therein defining a recess through which said first axis passes and a pair of arms respectively defining arcuate bearing surfaces respectively engaging said bracket in a bearing relationship under the influence of said spring.

8. An assembly as defined in claim 6 including means on said bracket on opposite sides of said first axis for engaging the bearing surfaces of said carrier.

9. An assembly as defined in claim 7 including a second arm and an intermediate bushing between said first and second arms, said first arm being pivotally connected to said intermediate bushing along a third axis, said inner arm being pivotally connect to said bushing along a fourth axis and said second arm also being pivotally connected to said bushing along said fourth axis.

10. An assembly as defined in claim 8 including a second inner arm located within said second arm and pivotally connected to said bushing along a fifth axis.

11. An assembly as defining in claim 9 including means for applying a counterbalancing force between said bushing and said second inner arm.

12. An assembly as defind in claim 10 wherein the means for applying a counterbalancing force between said bushing and said second inner arm includes a spring connected at one end to said second inner arm, a slide slidably mounted on said second inner arm and connected to said spring and a rigid link connected at one end to said slide and pivotally connected at another end to said bushing along a sixth axis.

* * * * *